(12) United States Patent
Potakowskyj

(10) Patent No.: US 6,987,574 B2
(45) Date of Patent: Jan. 17, 2006

(54) APPARATUS HAVING GUIDE MEANS FOR GUIDING A RECORD CARRIER TO BE SCANNED

(75) Inventor: Christoph Potakowskyj, Vienna (AT)

(73) Assignee: Sagem SA, Paris (FR)

( * ) Notice: Subject to any disclaimer, the term of this patent is extended or adjusted under 35 U.S.C. 154(b) by 919 days.

(21) Appl. No.: 09/761,251

(22) Filed: Jan. 16, 2001

(65) Prior Publication Data

US 2001/0013937 A1  Aug. 16, 2001

(30) Foreign Application Priority Data

Jan. 19, 2000 (EP) ............................................ 00890016

(51) Int. Cl.
G06F 15/00 (2006.01)

(52) U.S. Cl. ........................................ 358/1.1; 358/498

(58) Field of Classification Search ................. 358/1.1, 358/1.4, 1.6, 1.9, 474, 498, 1.8, 1.15, 494, 358/496, 400; 101/2, 11, 40; 347/32, 133; 382/312; 399/16, 124; 400/605, 624, 625
See application file for complete search history.

(56) References Cited

U.S. PATENT DOCUMENTS 5,651,623 A * 7/1997 Stodder et al. ............. 400/605
5,727,890 A * 3/1998 Stodder et al. ............. 400/624
5,738,454 A * 4/1998 Zepeda et al. .............. 400/625
5,820,121 A   10/1998 Lan ............................ 271/121
5,833,381 A * 11/1998 Kellogg et al. ............. 400/624
5,896,206 A * 4/1999 Kellogg ....................... 358/498
6,227,533 B1 * 5/2001 Jang ........................... 271/109
6,457,707 B1 * 10/2002 Hendrix et al. ............. 271/117

FOREIGN PATENT DOCUMENTS

EP          998904023          12/1999

* cited by examiner

Primary Examiner—Gabriel Garcia
(74) Attorney, Agent, or Firm—Quarles & Brady LLP

(57) ABSTRACT

An apparatus (1) into which a first stack (2) of record carriers to be printed and a second stack (5) of record carriers to be scanned can be inserted and which has holder means (25) for holding the first stack, which has load-exerting means (50) for urging the first stack (2) towards the withdrawal means (50), actuating means (63) for moving the load-exerting means (56) and guide means for guiding a record carrier (11) to be scanned, the actuating means (63) for moving the load-exerting means (56) are, in addition, configured as guide means for guiding a record carrier (11) to be scanned.

2 Claims, 4 Drawing Sheets

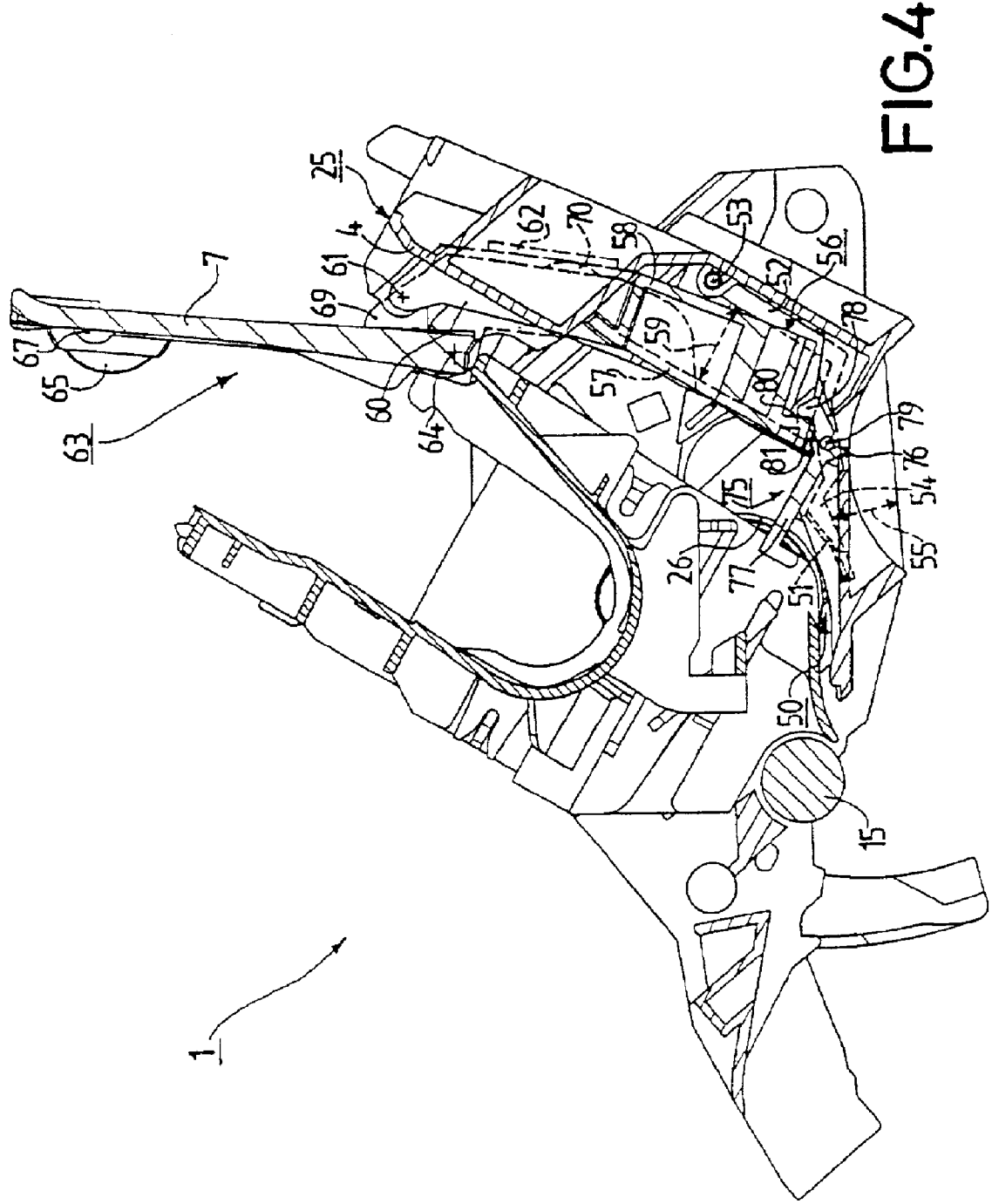

APPARATUS HAVING GUIDE MEANS FOR GUIDING A RECORD CARRIER TO BE SCANNED

BACKGROUND OF THE INVENTION

The invention relates to an apparatus that has been put on the market by the applicant under the type designation PPF271 and is consequently known. The known apparatus is a facsimile apparatus. The known apparatus has separate guide means for guiding a record carrier to be scanned, which means form additional elements and require additional space. Such additional guide means also raise the production costs and require assembly time, which in unfavorable.

SUMMARY OF THE INVENTION

It is an object of the invention to preclude the aforementioned situation and to provide an improved apparatus of the facsimile type.

In order to achieve this object an apparatus as defined in the opening part of claim 1, in addition, has the characteristic features of an apparatus which is configured to print each time one record carrier to be printed, and which is configured to scan each time one record carrier to be scanned, and which has holder means for holding a stack of record carriers to be printed, and which has withdrawal means for withdrawing each time one record carrier to be printed from the stack of record carriers to be printed, and which has load-exerting means which are movable between a load-exerting Position and a no-load position and which in their load-exerting position urge the stack held in the holder means, in its area near the withdrawal means, towards the withdrawal means under spring load and in their no-load position assure that a stack of record carriers to be printed can be introduced into the holder means without being influenced by the load-exerting means and which has actuating means for moving the load-exerting means from their load-exerting Position into their no-load position, and which has drive means for driving a record carrier to be scanned, and which has guide means for guiding a record carrier to be scanned and to be fed to the drive means, characterized in that the actuating means for moving the load-exerting means are, in addition, configured as guide means for guiding a record carrier to be scanned and to be fed to the drive means.

As a result of the provision of the characteristic features in accordance with the invention it is achieved in a simple manner that, in comparison with the known apparatus, an apparatus in accordance with the invention does not require any separate guide means and as a result of the use of the actuating means as guide means a compact construction and as well as a simple construction are obtained, which is favorable in view of a high reliability and in view of minimal production costs.

It has proved to be very advantageous when an apparatus in accordance with the invention, in addition, has the characteristic features as defined in claim 2. Such an embodiment has proved to be very advantageous in view of a simple operation and in view of a simple adjustability of the guide means.

The above-mentioned as well as further aspects of the invention will become apparent from the embodiment described hereinafter by way of example and will be elucidated with reference to this example.

BRIEF DESCRIPTION OF THE DRAWINGS

The invention will now be described in more detail with reference to the drawings, which show an embodiment given by way of example but to which the invention is not limited.

FIG. 4, in the same way as FIG. 3, shows the part of the apparatus of FIGS. 1 and 2, the load-exerting means being shown in their no-load position and the realignment means in their realignment position.

DESCRIPTION OF THE DETAILED DESCRIPTION

Figure 1:
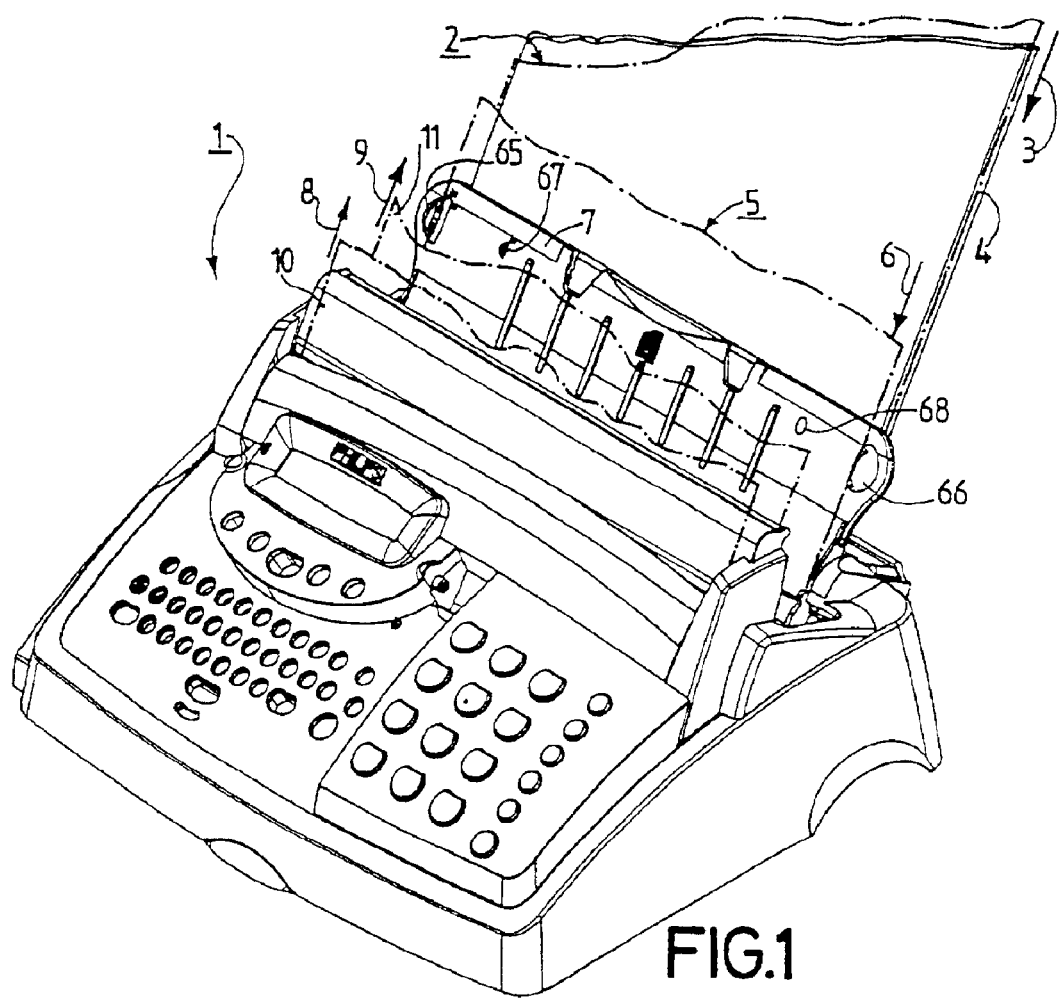
FIG. 1 is an oblique plan view of an apparatus in accordance with the invention in accordance with an embodiment of the invention, a scanning device of the apparatus being removed from the apparatus and, as a consequence, not being shown in FIG. 1.

FIG. 1 shows an apparatus 1 in accordance with an embodiment of the invention. In the present case, the apparatus 1 is a facsimile apparatus, hereinafter briefly referred to as the apparatus 1.

Figure 2:
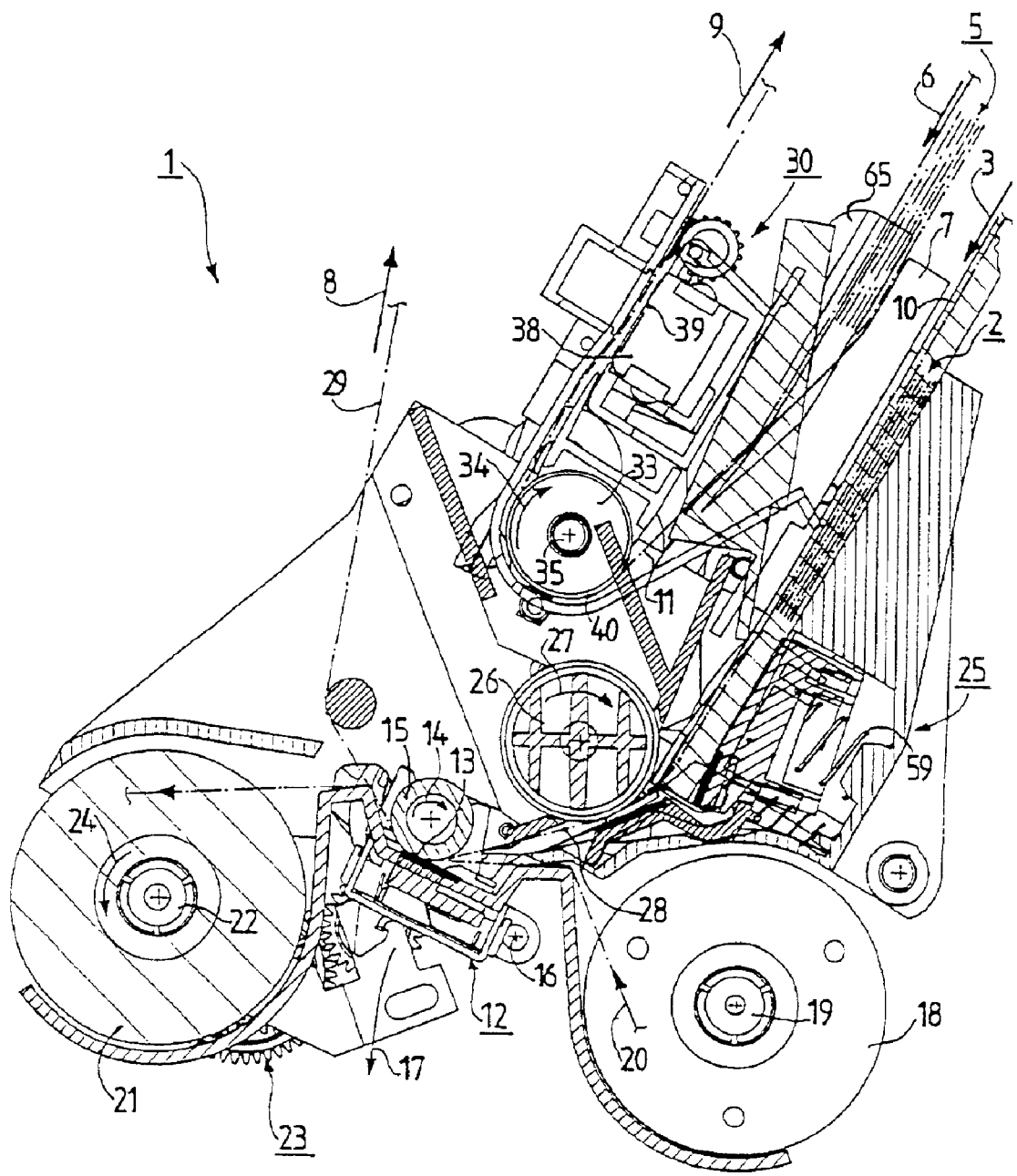
FIG. 2 is a partly diagrammatical cross-sectional view which shows a relevant part of the apparatus shown in FIG. 1, which part of the apparatus includes load-exerting means for exerting a load on a stack of record carriers to be printed, actuating means for the load-exerting means, and realignment means for re-aligning record carriers to be printed.

A first stack 2 of record carriers to be printed can be loaded into the apparatus 1 in a direction indicated by an arrow 3, which stack 2 is shown in dash-dot lines in FIGS. 1 and 2. In its loaded condition the stack 2 lies on a supporting plate 4 of the apparatus 1. Moreover, a second stack 5 of record carriers to be scanned can be loaded into the apparatus 1 in a direction indicated by an arrow 6. The second stack 5 is also shown in dash-dot lines. In its loaded condition the stack 5 lies against a guide plate 7 of the apparatus 1, which guide plate 7 is connected to additional actuating means with the aid of which load means for exerting a load on the first stack 2 of record carriers to be printed in the leading-edge areas of these record carriers can be reset, as will be described in more detail hereinafter. The currently uppermost record carrier to be printed can be withdrawn from the stack 2 of record carriers to be printed and can subsequently be fed to a printing roller and thereupon out of the apparatus 1 in a direction indicated by an arrow 8, as is shown in dash-dot lines in FIG. 1. Likewise, the currently uppermost record carrier to be scanned can be withdrawn from the second stack 5 of record carriers to be scanned and can be fed to a scanning device of the apparatus 1, which scanning device is not shown in FIG. 1 and by means of which it is possible to scan the graphic content of the respective record carrier to be scanned, after which the record carrier just scanned can be fed out of the apparatus 1 in the direction indicated by an arrow 9, as is also shown in dash-dot lines in FIG. 1.

The other parts of the apparatus 1 which are shown in FIG. 1, such as the housing, a telephone keypad, an alphanumeric keypad, a display device and the like, will not be described in any further detail.

The apparatus 1 is constructed to print a record carrier to be printed, which can be fed out of the apparatus 1 in the direction indicated by the arrow 8. The apparatus 1 is further constructed to scan a record carrier 11 to be scanned, which can be fed out of the apparatus 1 in the direction indicated by the arrow 9. This construction will be described in more detail with reference to FIG. 2.

The apparatus 1 includes a printing device 12 having a print head 13. The print head 13 is a thermal print head which is substantially strip-shaped and by means of which it is possible to print in a point-by-point fashion. This printing is effected on a record carrier 10 to be printed, i.e. a blank sheet. The record carrier 10 to be printed can be driven in steps with the aid of a printing roller 15 which is drivable in a direction indicated by an arrow 14 (i.e. clockwise). The printing roller 15 cooperates with the print head 13. The printing roller 15 is mounted in the apparatus 1 so as to be rotatable, but apart from that it is stationary. The printing device 12 is held against the printing roller 9 with the aid of spring means, not shown, the print head 13 thus being urged against the printing roller 15 under spring load. The printing device 12 including its print head 13 is pivotable about an axis 16 and is movable away from the printing roller 15 in a direction indicated by an arrow 17. The movement of the printing device 12 away from the printing roller 15 is effected with the aid of an actuating device which is not shown in FIG. 1 and which can be driven by means of the printing roller 15.

In the apparatus 1 a thermal-transfer printing process can be performed by means of the print head 13. In this thermal-transfer printing process a thermal-transfer foil is heated in a point-by-point fashion with the aid of the print head 13, as a result of which a wax-like dye carried by the thermal transfer foil is transferred to the record carrier 10 to be printed. Said thermal transfer foil is wound onto a first reel 18, the first reel 18 with the supply of thermal transfer foil being carried by a supply mandrel 19. From the first reel 18 the thermal transfer foil is led to a second reel 21 along a feed path 20 shown as a dash-dot line, which second reel is carried by a take-up mandrel 22. The take-up mandrel 22 can be driven by the printing roller 15 in a direction indicated by an arrow 24 via a transmission gear 23, which is shown partly in FIG. 2.

In order to print a record carrier 10 to be printed such a record carrier 10 to be printed should be withdrawn from a blank-sheet feeder 25 which contains a stack 2 of such record carriers to be printed, i.e. it should be separated from the stack. For this purpose, the apparatus 1 has a blank-sheet withdrawal roller 26, which is rotationally drivable in a direction indicated by an arrow 27, i.e. clockwise. The currently uppermost record carrier to be printed can be withdrawn from the first stack 2 in the blank-sheet feeder 25 with the aid of the blank-sheet withdrawal roller 26 and be fed into the area between the print head 12 and the printing roller 15. As soon as a record carrier 10 to be printed has reached the printing roller 15, the record carrier 10 to be printed is fed further by means of the printing roller 15, the blank-sheet withdrawal roller 26 then being out of driving engagement, as is already known per se from such apparatus since long. A record carrier 10 to be printed is fed between the blank-sheet feeder 25 and the printing roller 15 along a feed path 28 shown as a dash-dot line in FIG. 2. After the record carrier 10 to be printed has been printed the printed record carrier 10 is fed along a feed path 29, which is likewise shown as a dash-dot line in FIG. 2, and is then fed out of the apparatus 1 in the direction indicated by the arrow 8.

The apparatus 1 further includes a scanning device 30, by means of which a record carrier 11 to be scanned, i.e. an original document, can be scanned in order to convert the graphic information on the record carrier 11 to be scanned, for example alphanumeric characters, into digital signals. In FIG. 2 the scanning device 30 is shown only diagrammatically.

The scanning device 30 is accommodated in a separate housing. In this way, it is achieved that the scanning device 30 forms a separate unit and can consequently be separated readily and simply from the apparatus 1 so as to be removed from the apparatus 1. In a first mode of operation, in which the scanning device 30 is connected to the apparatus 1, as is illustrated in FIG. 2, as well as in a second mode of operation, in which it is separated from the apparatus 1, as is not shown in the Figures, said scanning device can scan a record carrier 11 to be scanned. In the first mode of operation as shown in FIG. 2, the record carrier 11 to be scanned can be fed past the scanning device 30, which is immobile in the apparatus 1, with the aid of drive means to be described briefly hereinafter. In the second mode of operation the scanning device 30 can be moved by hand over the stationary record carrier 11 to be scanned.

In order to enable scanning of a record carrier 11 to be scanned in the first mode of operation illustrated in FIG. 2, such a record carrier 11 to be scanned must be withdrawn from the second stack of record carriers to be scanned. For this purpose, the apparatus 1 has an original-document withdrawal roller 33, which is rotationally drivable in a direction indicated by an arrow 34 (i.e. clockwise). The original-document withdrawal roller 33 is mounted so as to be rotatable with the aid of a spindle 35. The original-document withdrawal roller 33 can be driven in steps in the direction indicated by the arrow 34, namely with the aid of apparatus-mounted drive means, which are neither shown nor described any further. The original-document withdrawal roller 33 provided as withdrawal means is accommodated in the scanning device 30, which withdrawal roller serves for withdrawing a record carrier 11 to be scanned from the second stack 5 of record carriers to be scanned, the leading edges of the record carriers to be scanned of this stack 5 being situated in the area of the withdrawal means, i.e. in the area of the original-document withdrawal roller 33, as can be seen in FIG. 2.

In order to enable the actual scanning of a record carrier 11 to be scanned after withdrawal of this record carrier 11 to be scanned, the withdrawn record carrier 11 to be scanned should be driven stepwise in the apparatus 1, the withdrawn record carrier 11 to be scanned being fed to an elongate scanning unit 38 during this driving process. The scanning unit 38 includes a photoelectrically operating scanning strip 39, which is held in close contact with a record carrier 11 to be scanned, namely in that spring means, not shown, urge the scanning unit 38 towards the record carrier 11 to be scanned.

For driving a withdrawn record carrier 11 to be scanned the apparatus 1 has two original-document drive rollers 40, of which only one original-document drive roller 40 is shown in FIG. 2 and which serve as drive means for driving a withdrawn record carrier 11 to be scanned in the apparatus 1, in order to feed the withdrawn record carrier 11 to be scanned to the scanning unit 38 and move it past the scanning device 30, i.e. past the scanning unit 38. The two original-document drive rollers 40 provided as drive means are also accommodated in the scanning device 30. Like the original-document withdrawal roller 33, the two original-document drive rollers 40 and 41 provided as drive means are also rotatably mounted with the aid of the spindle 35 and are coaxial with the original-document withdrawal roller 33. The two original-document drive rollers 40 consist of a material having a comparatively high coefficient of friction and have a diameter which is slightly greater than the diameter of the original-document withdrawal roller 33. Further details on the construction of the spindle 35 and the original-document withdrawal roller 33 as well as the two original-document drive rollers 40 and 41 can be found in, for example, the patent document U.S. Pat. No. 5,820,121 A.

As regards the drive means for the printing roller 15, the take-up mandrel 22, the blank-sheet withdrawal roller 26 and the original-document drive rollers 40, as well as the original-document withdrawal roller 33, reference is made to the European priority patent application of Dec. 23, 1999 having the application number 99 890 402.3, whose subject matter is incorporated herein by reference.

Figure 3:
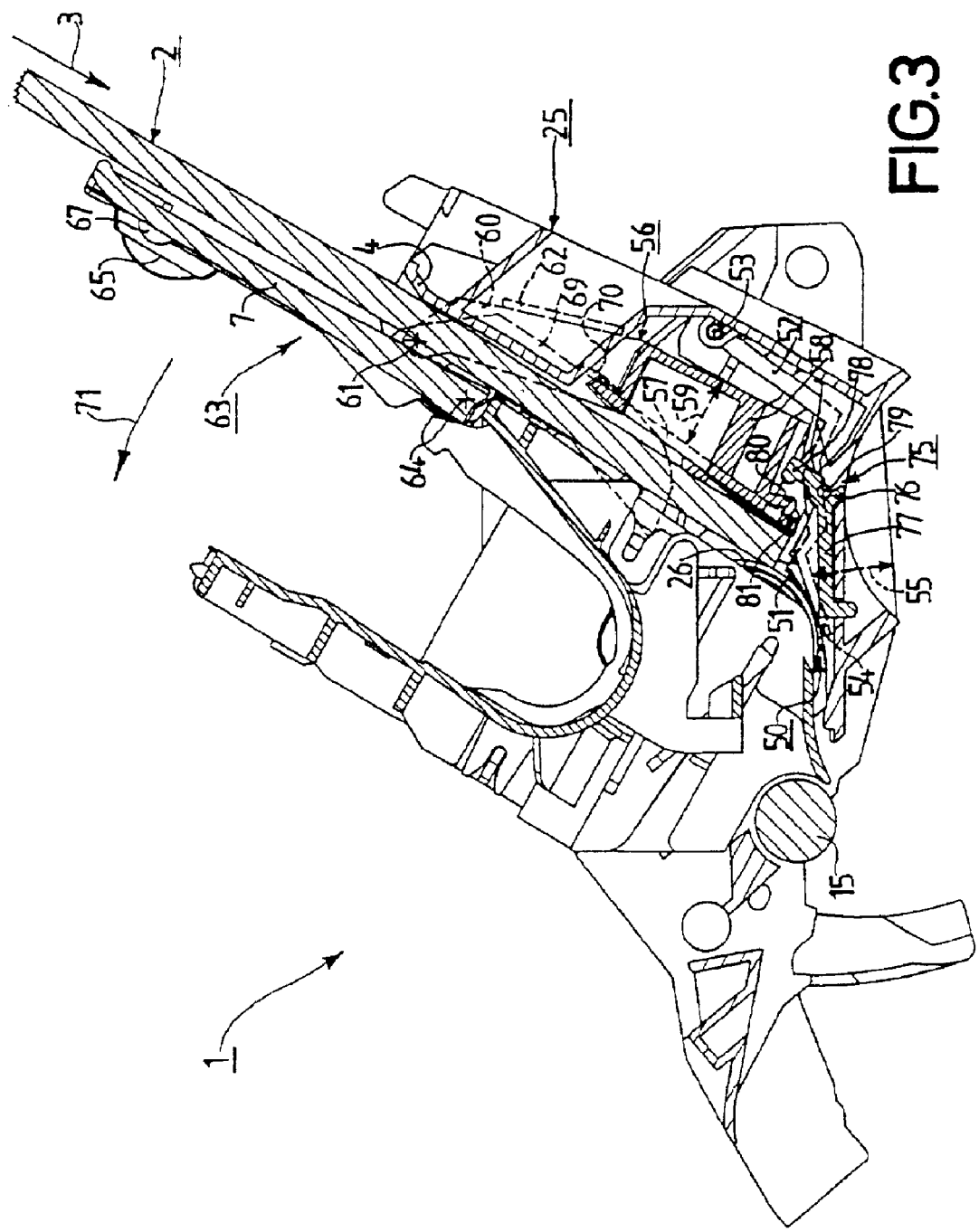
FIG. 3 is a cross-sectional view which shows a part of the apparatus of FIGS. 1 and 2 to an enlarged scale as compared with FIG. 2, which part includes the load-exerting means, the actuating means and the realignment means, the load-exerting means being shown in their load-exerting position and the realignment means in their rest position.

The following description mainly refers to FIGS. 3 and 4. FIGS. 3 and 4 do not show the scanning device 30 of the apparatus 1. The first stack 2 is shown only diagrammatically in FIG. 3. The first stack 2 is not shown at all in FIG. 4.

As already stated hereinbefore, the apparatus 1 includes a blank-sheet withdrawal roller 26 by means of which the currently uppermost record carrier to be printed of the first stack 2 can be withdrawn from the blank-sheet feeder 25 and can be fed into the area between the print head 12 and the printing roller 15. The blank-sheet withdrawal roller 26 forms a part of withdrawal means 50, which in addition to the blank-sheet withdrawal roller 26 also include a rubber sheet 51 adapted to cooperate with the circumferential surface of the blank-sheet withdrawal roller 26. To retain the rubber sheet 51 a retaining arm 52 having a plurality of bends has been provided in the area of the blank-sheet feeder 25, which forms the holder means 25 for holding the first stack 2 of record carriers to be printed, which arm is pivotable about a pivotal axis 53 and retains or carries the rubber sheet in the area of its free end 54. In the area of the free end 54 of the retaining arm 52 a pressure spring, which is shown diagrammatically as a dashed double-headed arrow 55, acts upon the retaining arm 52 and urges the retaining arm 52 and, consequently, the rubber sheet 51 towards the blank-sheet withdrawal roller 26 under spring load. In the operational situation illustrated in FIG. 3 the rubber sheet 51 lies against the circumferential surface of the blank-sheet withdrawal roller 26. In the operational situation shown in FIG. 4 the rubber sheet 51 is lifted off the circumferential surface of the blank-sheet withdrawal roller 26. How the rubber sheet 51 is lifted off the blank-sheet withdrawal roller 26 will be elucidated hereinafter.

The apparatus 1 has load-exerting means 56 in the area of the holder means 25 of the apparatus 1, i.e. in the area of the blank-sheet feeder 25 of the apparatus 1. The load-exerting means 56 are movable between a load-exerting position shown in FIG. 3 and a no-load position shown in FIG. 4. In their load-exerting position the load-exerting means 56 urge the first stack 2 of record carriers to be printed, present in the blank-sheet feeder 25, in its area near the withdrawal means 50 towards the withdrawal means 50 under spring load. In their no-load position the load-exerting means 56 allow the first stack 2 or an additional stack of record carriers to be printed to be inserted into the blank-sheet feeder 25 without being influenced by the load-exerting means 56.

The load-exerting means 56 include a pressure plate 57, which extends substantially over the whole width of a record carrier 10 to be printed. At its side which is remote from the first stack 2 the pressure plate 57 has two stiffening recesses 58, of which only one stiffening recess 58 is visible in the Figures. Two pressure springs 59 (see FIG. 2) act on the pressure plate 57, said springs being indicated only by means of a dashed double-headed arrow in FIGS. 3 and 4.

The load-exerting means 56 further include two pivotal arms 60 which are connected to the pressure plate 57 and the stiffening recesses 58 and which project from these elements, only one pivotal arm 60 being visible in FIGS. 3 and 4. With the aid of the two pivotal arms 60 the load-exerting means 56 are mounted in the apparatus 1 so as to be pivotable about a pivotal axis 61.

To enable the load-exerting means 56 to be moved from the load-exerting position shown in FIG. 3 into the no-load position shown in FIG. 4 each of the two pivotal arms 60 has a coupling limb 62, which projects laterally from the relevant pivotal arm 60.

To move the two coupling limbs 62 and, consequently, the load-exerting means 56 from their load-exerting position into their no-load position the apparatus 1 has actuating means 63. In the present case, the actuating means 63 for moving the load-exerting means 56 are advantageously constructed as guide means for guiding a record carrier 11 to be scanned, which is to be fed to the drive means for driving a record carrier 11 to be scanned, i.e. the two original-document drive rollers 40. The actuating means 63, which also form the guide means, are mounted in the apparatus 1 so as to be pivotable about a pivotal axis 64. The actuating means 63 include the guide plate 7, which is pivotable about the pivotal axis 64. The guide plate 7 has two guide projections 65 and 66 (see FIG. 1), of which only one guide projection 65 is visible in FIGS. 3 and 4. The two guide projections 65 and 66 each have a guide surface, the two guide surfaces facing one another and being spaced at a distance from one another, which distance corresponds to the dimension of a record carrier 11 to be scanned in a direction parallel to the pivotal axis 64. In the present case, this distance corresponds to the width of an A4 size sheet of paper.

In addition, the guide plate 7 has two further guide projections 67 and 68 (see FIG. 1) having a shape which essentially corresponds to that of the two guide projections 65 and 66, the distance between the guide surfaces of the two further guide projections 67 and 68 in the present case corresponding to the width of an A5 size sheet of paper.

The distances between the guide projections 65 and 66 and between the further guide projections 67 and 68 may also be different. Moreover, it is possible to use a construction which enables the distances between two associated guide projections to be varied.

The actuating means 63, as already stated, serve for moving the load-exerting means 56. For this purpose, the guide plate 7 is connected to two actuating arms 69, of which only one actuating arm 69 is visible in FIGS. 3 and 4. The two actuating arms 69 project from the guide plate 7 towards the withdrawal means 50. Each of the two actuating arms 69 has a cup-shaped actuating projection 70. The two actuating projections 70 have been provided and constructed to cooperate with the two coupling limbs 62 of the load-exerting means 56.

When the actuating means 63 are moved out of their initial position, i.e. pivoted about the pivotal axis 64, in the direction indicated by the arrow 71, the actuating projections 70 engage against the coupling limbs 62 during this pivotal movement, as a result of which the coupling limbs 62 and, consequently, the load-exerting means 56 are moved from their load-exerting position shown in FIG. 3 into their no-load position shown in FIG. 4 against the action of the pressure springs 59, the actuating means 63 then assuming a position as shown in FIG. 4.

Advantageously, the apparatus 1 has realignment means 75 adjacent the transitional area between the blank-sheet feeder 25 and the withdrawal means 50. In the present case, the realignment means 75 have a two-arm realignment lever 76. The two-arm realignment lever 76 has a realignment arm 77 and a realignment arm 78, forming an actuating portion of the realignment means 75. The two-arm realignment lever 76 is mounted so as to be pivotable about a pivotal axis 79.

The realignment means 75 are movable between a rest position shown in FIG. 3 and a realignment position shown in FIG. 4. When the load-exerting means 56 are moved from their load-exerting position shown in FIG. 3 into their no-load position shown in FIG. 4 with the aid of the actuating means 63, the realignment means 75 are movable from their rest position into their realignment position. The realignment arm 77 of the realignment means 75 effects a realignment of record carriers to be printed which have been moved from the first stack 2 towards the withdrawal means 50. In this way, it is achieved that during a movement of the actuating means 63, in order to allow the introduction of additional record carriers to be printed into the blank-sheet feeder 25, the record carriers to be printed which are already present in the blank-sheet feeder 25 and which have already been fed at least a little way towards the withdrawal means 50 are returned into their initial position in the blank-sheet feeder 25 already before the introduction of additional record carriers to be printed, as a result of which the record carriers to be printed and already present in the blank-sheet feeder form a correctly aligned stack prior to the introduction of additional record carriers to be printed. Thus, it is guaranteed that a correctly aligned stack of record carriers in the blank-sheet feeder 25 is obtained also when additional record carriers to be printed are introduced and after such additional record carriers to be printed have been introduced.

In the apparatus 1 the realignment means 75 are movable with the aid of the load-exerting means 56 from their rest position shown in FIG. 3 into their realignment position shown in FIG. 4. For this purpose, the load-exerting means 56 have an actuating nose 80 which during a movement of the load-exerting means 56 from their load-exerting position into their no-load position enters into operational engagement with the actuating arm 78 of the realignment means 75 and thereby produce a movement, namely a pivotal movement, of the realignment means 75 from their rest position into their realignment position. The opposite movement 75 of the realignment means 75 from their realignment position into the rest position is obtained under the influence of gravity; however, this movement can alternatively be obtained by means of the next record carrier to be printed that is withdrawn.

The apparatus 1 further includes additional means 81 formed by a further actuating nose 81 which projects laterally from the actuating nose 80 in the area of the actuating nose 80 of the load-exerting means 56. The additional means 81 make it possible to disable the withdrawal means 50 for the withdrawal of each time one record carrier to be printed, when the load-exerting means 56 are moved from their load-exerting position into their no-load position with the aid of the actuating means 63. The withdrawal means 50 are then simply disabled in that during the movement of the load-exerting means 56 from their load-exerting position into their no-load position the additional means 81, i.e. the further actuating nose 81, abuts against the retaining arm 52 for the rubber sheet 51 and subsequently pivots the retaining arm 52 about the pivotal axis 53 away from the blank-sheet withdrawal roller 26, as a result of which the rubber sheet 51 is lifted off the circumferential surface of the blank-sheet withdrawal roller 26, thereby disabling the withdrawal means 50. This guarantees that also record carriers to be printed which are already in operational engagement with the rubber sheet 51 of the withdrawal means 50 are realigned into their initial positions in the blank-sheet feeder 25 with the aid of the realignment means 75.

What is claimed is:

1. An apparatus which is configured to print each time one record carrier to be printed, which is configured to scan each time one record carrier to be scanned, which has holder means for holding a stack of record carriers to be printed, which has withdrawal means for withdrawing each time one record carrier to be printed from the stack of record carriers to be printed, which has load-exerting means which are movable between a load-exerting position and a no-load position and which in their load-exerting position urge the stack held in the holder means, in its area near the withdrawal means, towards the withdrawal means under spring load and in their no-load position assure that a stack of record carriers to be printed can be introduced into the holder means without being influenced by the load-exerting means and which has actuating means for moving the load-exerting means from their load-exerting position into their no-load position, which has drive means for driving a record carrier to be scanned, and which has guide means for guiding a record carrier to be scanned and to be fed to the drive means, characterized in that the actuating means for moving the load-exerting means are, in addition, configured as guide means for guiding a record carrier to be scanned and to be fed to the drive means.

2. An apparatus as claimed in claim 1, characterized in that the actuating means are arranged so as to be pivotable about the pivotal axis, and the guide plate has at least two guide projections which each have a guide surface, the two guide surfaces being spaced at a distance from one another, which distance corresponds to the dimension of a record carrier to be printed in a direction parallel to the pivotal axis.

* * * * *